United States Patent [19]

Aidlin et al.

[11] 4,418,482

[45] Dec. 6, 1983

[54] DEVICE AND METHOD FOR FEEDING HOT ARTICLES TO PREVENT MUTUAL ADHERENCE THEREOF

[76] Inventors: Samuel S. Aidlin, 50-79 Village Garden Dr., Sarasota, Fla. 33580; Stephen H. Aidlin, 7442 Vanderipe Rd., Sarasota, Fla. 33583

[21] Appl. No.: 430,709

[22] Filed: Sep. 30, 1982

[51] Int. Cl.³ .......................... F26B 7/00; F26B 25/02
[52] U.S. Cl. .......................................... 34/20; 34/105; 34/236; 198/389; 264/237
[58] Field of Search ............... 264/237, 535; 425/526; 198/389; 34/20, 105, 236

[56] References Cited

U.S. PATENT DOCUMENTS

| | | | |
|---|---|---|---|
| 2,501,367 | 3/1950 | Wehmiller et al. | 34/105 |
| 3,089,254 | 5/1963 | Johnson et al. | 34/105 |
| 3,112,186 | 11/1963 | Davis et al. | 34/20 |
| 3,267,585 | 8/1966 | Futer | 34/20 |
| 4,223,778 | 9/1980 | Kontz | 198/389 |

*Primary Examiner*—Larry I. Schwartz
*Attorney, Agent, or Firm*—Erwin S. Teltscher

[57] ABSTRACT

A device for feeding hot articles and a method of feeding the same include transporting hot articles by a transporting element one after the other, and positively directing cooling air supplied by a blower toward the hot articles during their transportation so that the cooling air flows around the articles to cool and to prevent mutual adherence of the hot articles to one another.

4 Claims, 4 Drawing Figures

DEVICE AND METHOD FOR FEEDING HOT ARTICLES TO PREVENT MUTUAL ADHERENCE THEREOF

BACKGROUND OF THE INVENTION

The present invention relates to a device for and a method of feeding hot articles.

Feeding devices and methods for feeding hot articles, particularly one after another are known in the art. One of such devices and methods are disclosed, for example, in the U.S. Pat. No. 2,858,930. In the device and method described in this patent articles are supplied one after another by respective transporting means. When it is necessary to feed hot articles, such as for example pre-molded bottle blanks to a blow-molding machine from a pre-molding machine, the feeding encounters considerable problems in that the hot pre-molded bottle blanks ejected in a very hot state from the pre-molding machine tend to adhere to one another. This results in many rejected pre-molds or otherwise deformed bottles. For preventing the above mentioned adherence of the hot pre-molds to one another, it was proposed to transport the hot pre-molds in a considerably longer path to allow ambient air to cool the pre-molds. It is to be understood that this makes the process much longer and considerably increases the length of the machinery as well as makes the latter more complicated.

SUMMARY OF THE INVENTION

Accordingly, it is an object of the present invention to provide a device for and a method of feeding hot articles, which avoid the disadvantages of the prior art.

More particularly, it is an object of the present invention to provide a device for and a method of feeding hot articles, which reliably prevent adherence of the hot articles to one another and at the same time do not make the process longer and do not cause necessity to make the machinery longer or more complicated.

In keeping with these objects and with others which will become apparent hereinafter, one feature of the present invention resides, briefly stated, in a device for feeding hot articles which has means for transporting hot articles one after the other is provided in accordance with the invention which a blower arranged so that it positively directs cooling air toward the hot articles and the cooling air flows around the hot articles thereby cooling the latter and preventing their adherence to one another.

When the device is designed in accordance with the present invention, it reliably prevents adherence of the hot articles to one another. At the same time it is not necessary to transport the articles longer in a longer and more complicated machinery to expose them to the action of ambient air to cool the articles, which is particularly advantageous if the articles are made of synthetic plastic material.

Another feature of the present invention is a method of feeding articles, in accordance with which the articles are transported one after the other, and a blower supplies air toward the articles so that the cooling air flows around the articles to cool and to prevent adherence of the latter relative to one another.

A further feature of the present invention is that the blower is arranged so that the cooling air supplied by the blower contributes to forces acting to move the hot articles from the supply element to the transporting means. The cooling air acts in the direction of transportation on the hot articles and urges them additionally to move in the same direction.

These and other objects and features of the present invention will become more clear from a description of a preferred embodiment of the invention which is shown in the accompanying drawing.

DESCRIPTION OF A PREFERRED EMBODIMENT

Figure 1:
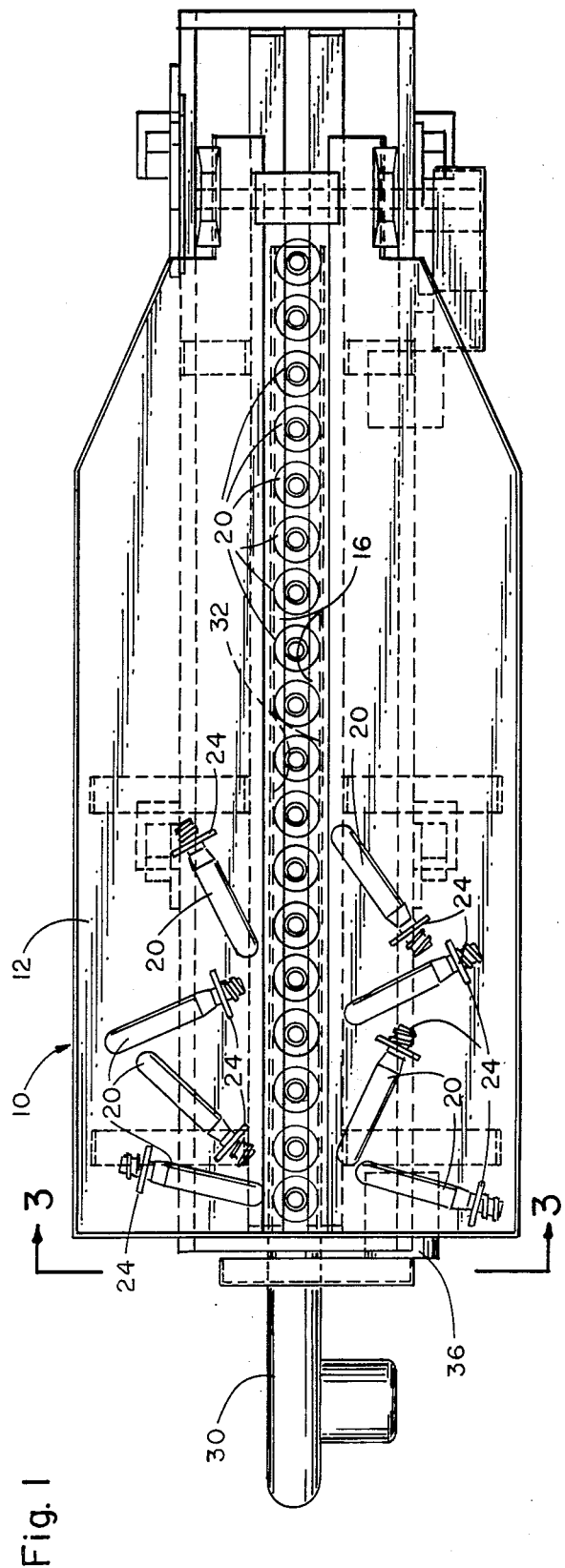
FIG. 1 is a top plan view of a device for feeding hot articles in accordance with the present invention.
Figure 2:
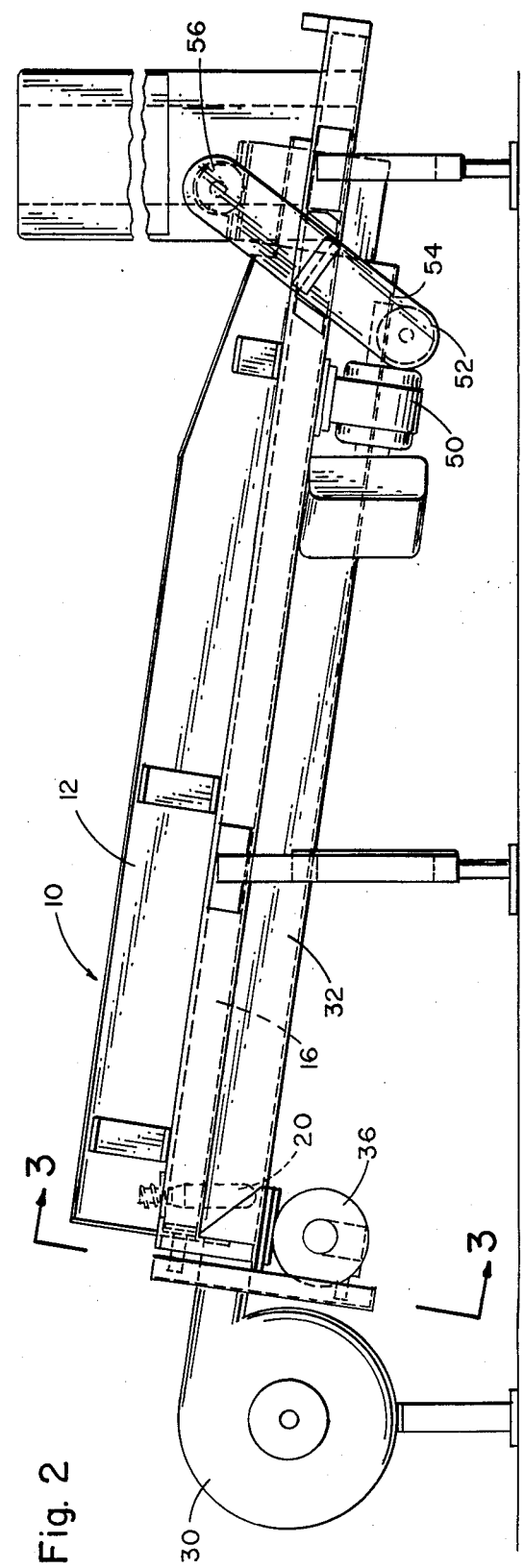
FIG. 2 is a side elevational view of the device for feeding of FIG. 1.
Figure 3:
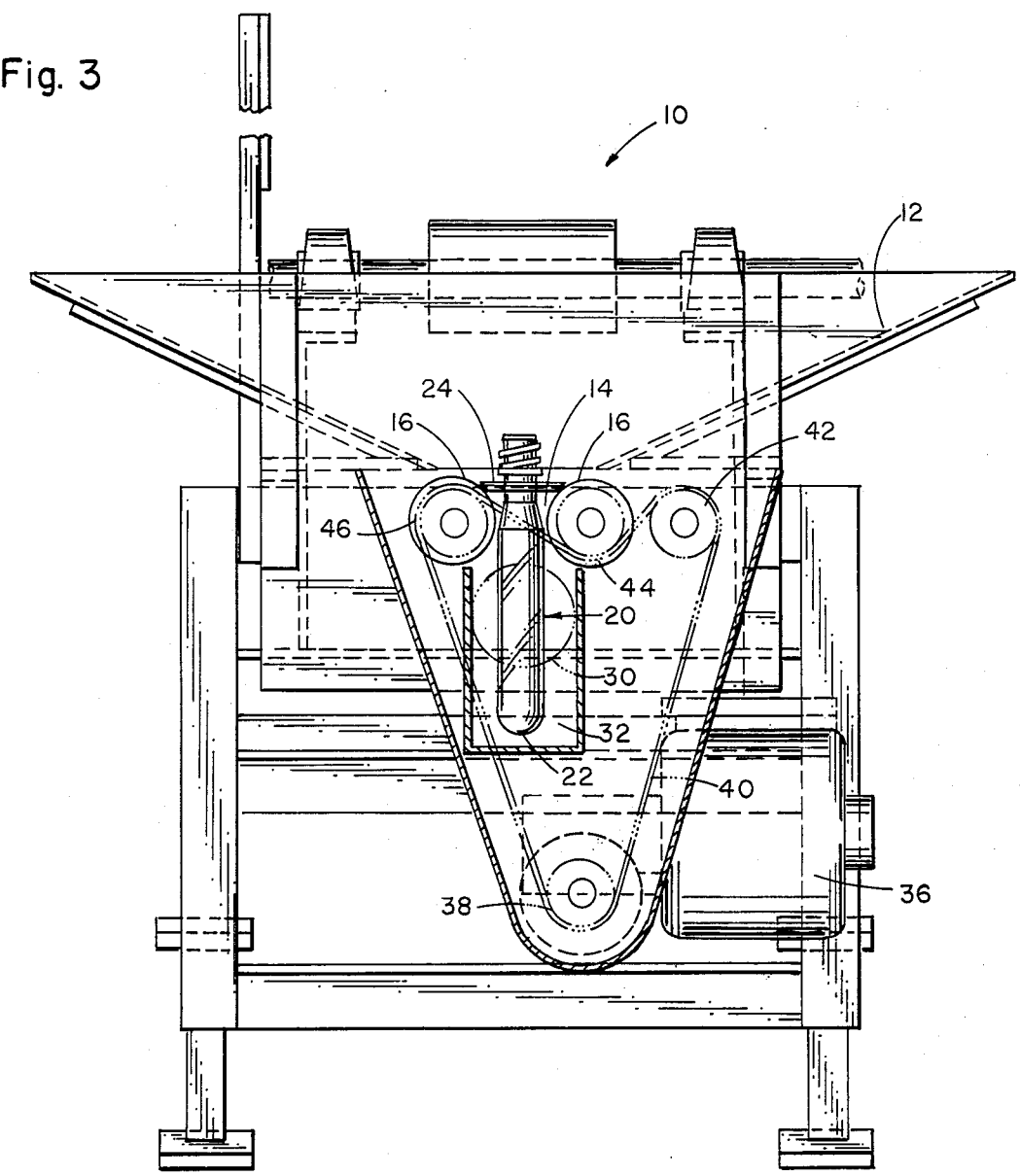
FIG. 3 is a view showing a selection of the inventive device for feeding hot articles, taken along the line 3—3 in FIGS. 1 and 2
Figure 4:
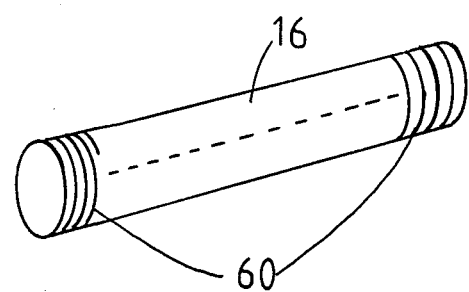
FIG. 4 is a perspective view of one roller showing a "phonograph type" or helical groove formed therein.

A device for feeding hot articles, such as hot pre-molded bottle blanks, in accordance with the present invention is identified as a total with reference numeral 10. The feeding device has a hopper 12 into which the pre-molds are supplied from a pre-molding machine. The hopper 12 is provided with an opening in its bottom part.

A pair of rollers 16 are arranged under the hopper 12 so as to form a slot 14 therebetween. The rollers 16 are inclined and therefore have an upper end and a lower end. The rollers 16 are "phonograph finished" or in other words are provided with minute grooves which are helically-shaped so as to provide urging of the pro-molds toward the lower end of the rollers. The rollers 16 are driven in rotation by a motor 46 through a pulley 38, a belt 40, an idler pulley 42 and two pulleys 44 and 46 rotating in opposite directions.

A lifting belt conveyor is arranged at the lower end of the rollers 16 and operates for transferring the pre-molds to a not shown blow-molder which is known per se in the art. The lifting belt conveyor has a belt 54 rotating on pulleys 52 and 56 driven in rotation by a motor 50.

In accordance with the inventive features, a plenum 32 is arranged substantially under the rollers 16 so that during transportation of the pre-molds they move in the interior of the plenum which is substantially closed. A blower 30 is located at the upper end of the rollers 16 and supplies cooling air into the interior of the plenum.

The feeding device in accordance with the invention operates in the following manner:

The pre-molds from a pre-molding machine are supplied into the hopper 12 and immediately discharged from the latter through the slot 14 between the rollers 16 which rotate in the opposite directions. A heavier rounded end 22 of the tubular pre-molds 20 drops down into the slot 14 and the premold 20 is held by its ring collar 24 during transportation. The rollers 16 then transport the pre-molds 20 under the action of their helical grooves 60 and also gravity force. During the transportation the pre-molds 20 move in the interior of the substantially closed plenum 32. The blower 30 at the upper end of the rollers 16 directs the cooling air into the plenum 32 so that the cooling air flows around the pre-molds 20 and prevents their mutual adherence which can otherwise take place since the pre-molds are very hot. The cooling air supplied by the blower 30 into the plenum 32 acutally in direction from the upper end to the lower end of the rollers 16 adds to the helical and gravitational urging of the pre-mold in this direction.

The invention is not limited to the details shown since various modifications and structural changes are possible without departing in any way from the spirit of the present invention.

What is claimed and desired to be protected by Letters Patent is set forth in the appended claims:

1. A device for feeding hot articles, particularly pre-molded blanks, each having a ring collar, comprising in combination
    a pair of rollers spaced a predetermined distance smaller than the diameter of said ring collar from one another for transporting the hot articles one after the other in a predetermined direction, said rollers being rotatable in opposite directions along respective axes of rotation thereof,
    a substantially closed plenum located under said rollers, and extending in an axial direction substantially over the entire length of said rollers,
    blower means arranged to positively direct cooling air toward the hot articles during their transportation so that the cooling air flows around the articles to cool said articles, and to prevent mutual adherence of the hot articles to one another,
    said rollers each having an outer surface provided with a helical groove for engaging and holding the ring collar of each of said articles during transportation of said hot articles so as to move said articles in a translatory manner only along the axial direction along said rollers and inside said plenum located under said rollers, said helical groove having dimensions similar to that of a phonograph groove formed on a phonograph roller.

2. A device as defined in claim 1, wherein said transporting means transport the hot articles in a predetermined direction, said blower means being arranged so that the cooling air additionally urges the hot articles to move in said direction in which they are transported by said transporting means.

3. In a method of feeding hot articles, particularly pre-molded bottle blanks each having a relatively heavy rounded bottom, and being provided with a ring collar, the articles being fed with the air of a pair of rollers spaced at a predetermined slot distance from one another, said slot distance being smaller than the diameter of said ring collar, said rollers being rotatable in opposite directions, each roller having an outer surface provided with at least one helical groove having dimensions similar to that of a phonograph groove formed on a phonograph roller and being operative for engaging the ring collar of each of said hot articles, a substantially closed plenum being located under said rollers and extending in an axial direction substantially over the entire length of said rollers, the steps comprising
    dropping said hot articles within an article-receiving region into said slot with said bottom facing downwardly,
    engaging and holding the ring collar of each of said articles with said helical groove during transportation of said hot articles so as to move said articles in a translatory manner only along an axial direction along said rollers, and inside said plenum located under said rollers from said receiving region to a discharge region, and
    positively directing cooling air toward said hot articles during their transportation so that the cooling air flows around the articles to cool them, and to prevent mutual adherence of the hot articles to one another.

4. A method as defined in claim 3, wherein said transporting step includes transporting the hot articles in a predetermined direction, said positively directing step including supplying the cooling air so that it additionally urges the hot articles to move in the direction in which they are transported by the transporting means.

* * * * *